US009479923B2

(12) United States Patent
Bajko (10) Patent No.: US 9,479,923 B2
(45) Date of Patent: Oct. 25, 2016

(54) PROVISIONING WIRELESS SUBSCRIPTIONS USING SOFTWARE-BASED SUBSCRIBER IDENTITY MODULES

(71) Applicant: Nokia Corporation, Espoo (FI)

(72) Inventor: Gabor Bajko, Sunnyvale, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/251,749

(22) Filed: Apr. 14, 2014

(65) Prior Publication Data

US 2014/0315535 A1   Oct. 23, 2014

Related U.S. Application Data

(60) Provisional application No. 61/812,808, filed on Apr. 17, 2013.

(51) Int. Cl.
| | |
|---|---|
| *H04M 3/00* | (2006.01) |
| *H04W 8/20* | (2009.01) |
| *H04W 8/18* | (2009.01) |
| *H04W 8/26* | (2009.01) |
| *H04W 84/12* | (2009.01) |

(52) U.S. Cl.
CPC ............... *H04W 8/20* (2013.01); *H04W 8/183* (2013.01); *H04W 8/265* (2013.01); *H04W 84/12* (2013.01)

(58) Field of Classification Search
CPC ....... H04W 4/02; H04W 4/04; H04W 4/025; H04W 4/027; H04W 8/20; H04W 8/183; H04W 8/265; H04W 84/12
USPC .................................. 455/410, 411, 418, 419
See application file for complete search history.

(56) References Cited

U.S. PATENT DOCUMENTS

| | | | |
|---|---|---|---|
| 9,083,581 B1 * | 7/2015 | Addepalli | H04W 4/046 |
| 2005/0266883 A1 | 12/2005 | Chatrath | 455/558 |
| 2007/0070935 A1 | 3/2007 | Prakash et al. | 370/328 |
| 2010/0311402 A1 * | 12/2010 | Srinivasan | H04W 8/183 |
| | | | 455/418 |
| 2012/0196569 A1 | 8/2012 | Holtmanns et al. | 455/411 |
| 2012/0230305 A1 * | 9/2012 | Barbu | H04W 48/20 |
| | | | 370/338 |
| 2012/0263298 A1 * | 10/2012 | Suh et al. | 380/255 |
| 2013/0196621 A1 * | 8/2013 | Guday et al. | 455/406 |

FOREIGN PATENT DOCUMENTS

| | | | |
|---|---|---|---|
| EP | 1763266 A1 | 3/2007 | |
| WO | WO-2012/177200 A1 | 12/2012 | |

OTHER PUBLICATIONS

"Real-Time Provisioning of SIM Cards: A Boon to GSM Operators", Dan Baker, http://billingworld.com; Virgo Publishing, 2013, 2 pgs.

(Continued)

*Primary Examiner* — Wayne Cai
(74) *Attorney, Agent, or Firm* — Harrington & Smith (57) ABSTRACT

Provisioning of a cellular subscription to a mobile device is performed over a Wi-Fi network, wherein the mobile device may be configured to use a software-based subscriber identity module. A configuration file is stored in an electronic memory of the mobile device that includes information about at least one cellular technology and at least one frequency band supported by the mobile device. This configuration file may constitute a management object or may be linked to an existing management object of the device by extending a structure of the existing management object.

23 Claims, 4 Drawing Sheets

(56) References Cited

OTHER PUBLICATIONS

3GPP TR 33.812 V9.2.0; "3$^{rd}$ Generation Partnership Project; Technical Specification Group Services and System Aspecte; Feasibility study on the security aspects of remote provisioning and change of subscription for Machine to Machine (M2M) equipment (Release 9)"; Jun. 2010; whole document (87 pages).

Armitage, S.; "Overview of IEEE 802.11u"; Mar. 2012; whole document (5 pages).

\* cited by examiner

PROVISIONING WIRELESS SUBSCRIPTIONS USING SOFTWARE-BASED SUBSCRIBER IDENTITY MODULES

CROSS-REFERENCE TO RELATED APPLICATIONS

This application claims priority from U.S. Provisional Application No. 61/812,808, filed on Apr. 17, 2013 and incorporated herein by reference in its entirety.

TECHNICAL FIELD

The exemplary and non-limiting embodiments of this invention relate generally to wireless communication methods, apparatuses, and computer program products; and, more specifically, to methods, apparatuses, and computer program products for provisioning wireless subscriptions using software-based Subscriber Identity Modules (SIMs).

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
AuC authentication center
AUTN authentication token
CK confidential key
DM device management
DMT device management tree
EAP extensible authentication protocols
eNB evolved Node B
GPRS general packet radio service
HS 2.0 HotSpot 2.0
ICCID integrated circuit card identifier
IK integrity key
IMEI international mobile equipment identity
IMSI international mobile subscriber identity
LTE long term evolution
MILENAGE authentication algorithm for 3GPP
MNO mobile network operator
MO management object
NAND not AND
NOR not OR
NVM non-volatile memory
OMA open mobile alliance
OS operating system
OTA over-the-air
PC personal computer
PDA personal digital assistant
RAM random access memory
RAN radio access network
RSN robust security network
SIM subscriber identity module
SMS short message service
SOAP simple object access protocol
SW-SIM software-based subscriber identity module
UE user equipment
UMTS universal mobile telecommunications system
URI uniform resource identifier
URL uniform resource locator
WFA Wi-Fi Alliance
WLAN wireless local area network
WPA Wi-Fi protected access
XML extensible markup language In many wireless communication networks, a mobile equipment user is required to have a subscription in order to access the network. The mobile equipment may be any type of machine, apparatus or device that is enabled to utilize a mobile network, provided that the machine, apparatus or device has sufficient access credentials. The subscription identifies, among other things, the mobile network, in which the mobile equipment is to be used and the individual settings relating to the subscription. These setting can include a network operator setting and a subscriber identifier corresponding to the mobile equipment user. The user might be an individual user, a corporation, an organization, or a group.

A Subscriber Identity Module (SIM) card is a physical, hardware-based integrated circuit card for securely storing subscription credentials associated with the mobile equipment user. The SIM card typically contains subscriber details, security information and memory for a personal directory of numbers. The SIM card also stores data that identifies the caller to the network service provider. As used herein, the terms "subscription credentials", "SIM data", and "access credentials" can be understood as referring not only to a cryptographic secret, but also to related cryptographic data such as an algorithm, as well as operator-specific settings required for network access. The subscription data may be stored in an area of computer-readable memory, or encoded on a microcontroller operating as the processor unit for a device, or both stored and encoded. These stored or encoded subscription credentials may be loaded into the mobile equipment being used. Some wireless communication standards, such as GSM and UMTS, use the SIM card to store a service subscriber key corresponding to the user of the mobile device. The SIM card may also be used to perform authentication procedures in connection with security-sensitive tasks.

Although conventional SIM cards may be used to access UMTS networks, a more advanced physical SIM card known as a Universal Subscriber Identity Module (USIM) card has been developed for use with UMTS networks. The USIM card includes a microcomputer which is configured to execute any of several mini-applications. For example, the USIM card may be programmed to implement an electronic purse for use on a public transportation system, or to provide a local service portal that provides access to a utility bill. A UMTS handset equipped with a USIM card can be used to make video calls, assuming that the calling party and the called party are both served by a third-generation (3G) network. Voice calls and data exchanges are encrypted by the USIM using one or more security keys that are computed by the USIM. The USIM security keys are stronger and more secure than those provided by conventional SIMs. The USIM card also provides for a much larger phone book than a conventional SIM card, with the USIM being configured to store contact names, email addresses, primary telephone numbers and secondary telephone numbers for thousands of contacts. The USIM stores these contacts in an encrypted manner, providing for an enhanced level of security relative to storing the contact information directly in phone memory.

SIM and USIM cards allow a user to change mobile devices by removing the SIM or USIM card from one mobile device and inserting it into another mobile device. The form factor of the SIM or USIM may be an embedded chip, a platform mounted chip, a logical unit on a larger processor, a protected memory card or a smart card. The chip may hold one or more sets of subscriptions or applications.

At present, a wireless communication network may use any one of several different over-the-air techniques or protocols to update a SIM or USIM card. For example, the communication network may include or interface with a central database that backs-up personal information for a plurality of SIM or USIM cards. The network device may transfer the stored back-up information corresponding to a particular user from the database to the user's SIM or USIM card upon request. While such over-the-air transfer techniques provide some personal information, they currently do not provide a complete or secure SIM or USIM subscription credential transfer. Thus, conventional over-the-air information transfer techniques still require a physical SIM or USIM card in the target device to ensure the security and the integrity of the transfer.

While SIM and USIM cards may be appropriate for high-end or complex mobile devices, such as smart mobile telephones and tablet devices, the costs associated with a SIM or USIM card may be prohibitively high for simple, low-cost mobile devices. Furthermore, while some wireless communication standards may require the implementation of security functions that are now performed by conventional physical SIM or USIM cards, such standards may not require an actual hardware implementation of a SIM or USIM in the form of a card. Thus, there remains a need for SIM solutions that are alternatives to conventional physical SIM and USIM cards.

The SIM and USIM cards are not movable between devices without utilizing a manual process. Indeed, a person owning multiple mobile devices has to manually move the SIM or USIM card containing subscriber identification information from one terminal to another. Typically, this long and cumbersome process includes: switching off the terminal, removing the back cover of the device, removing the battery, removing the SIM/USIM card, replacing the battery, replacing the cover, opening the cover of the second terminal, removing the battery of the second terminal, putting the SIM/USIM card into the second terminal, replacing the battery of the second terminal, replacing the cover of the second terminal, and powering up the second terminal. This manual process of transferring a SIM/USIM card from one device to another only works if both devices are available. Also, if the device or terminal is lost or stolen, the user also loses the SIM card. Heretofore, there are no solutions that address these problems.

Another shortcoming of physical SIM and USIM cards is that they are not always provided or furnished with newly-acquired mobile equipment. In this case, a user will have to separately obtain the access credentials for the acquired mobile equipment before the equipment can be used on the wireless communication network. This can cause an inconvenience to the user, at least for the reason that obtaining either the SIM/USIM card or the SIM download may require that the user bring the mobile equipment to a dealer who is associated with a given wireless communication network. In addition, for cost reasons, design reasons or to reduce the risk of theft, some mobile equipment may not be equipped with a slot for accommodating a SIM or USIM card. In this case, in order to obtain access to the wireless communications network, the required access credentials would need to be downloaded directly from the network, or the mobile equipment would need to be carried to a dealer that is associated with the network.

Yet another shortcoming of SIM and USIM cards is that cellular carriers need to provide their subscribers with a physical card. Costs are incurred in manufacturing, distributing, and programming these cards. It would be desirable to eliminate these costs. Moreover, once a SIM or USIM card is programmed, it cannot be changed, only replaced. Consequently, when a wireless network operator offers new services or makes changes to its existing offerings, the network operator needs to send a new SIM or USIM card to the subscriber.

SUMMARY

According to a first set of exemplary embodiments of the invention, a method includes storing a configuration file in an electronic memory of a mobile device, the configuration file including information specifying at least one cellular technology and at least one frequency band supported by the mobile device; and using the configuration file to perform provisioning of a cellular subscription to the mobile device over a Wi-Fi network.

According to a second set of exemplary embodiments of the invention, an apparatus comprises one or more processors and one or more memories including computer program code, the one or more memories and the computer program code configured, with the one or more processors, to cause the apparatus to perform at least storing a configuration file in an electronic memory of a mobile device, the configuration file including information specifying at least one cellular technology and at least one frequency band supported by the mobile device; and using the configuration file to perform provisioning of a cellular subscription to the mobile device over a Wi-Fi network.

According to a third set of exemplary embodiments of the invention, a computer program product comprises a computer-readable storage medium bearing computer program code embodied therein for use with a computer, the computer program code comprising code for storing a configuration file in an electronic memory of a mobile device, the configuration file including information specifying at least one cellular technology and at least one frequency band supported by the mobile device; and using the configuration file to perform provisioning of a cellular subscription to the mobile device over a Wi-Fi network.

Pursuant to a set of further embodiments of the present invention, the mobile device detects during a Wi-Fi scanning procedure a Wi-Fi network that is capable of performing an online provisioning of a software-based subscriber identity module to be used to access at least one type of a cellular network.

Pursuant to a set of still further embodiments of the present invention, the Wi-Fi signal is received in one or more of a beacon frame or a probe response frame.

Pursuant to a set of still further embodiments of the present invention, in response to receipt of the advertising signal, the mobile device may identify an icon, a name, and/or a unique identifier of a provider of the software-based subscriber identity module, to be used for cellular network access.

Pursuant to another set of exemplary embodiments, these embodiments may cover the case when the received signal only indicates to the mobile device that provisioning of a software-based subscriber identity module is available at that Wi-Fi network; the mobile device may then query for more information, which would allow the mobile device to identify an icon, a name, and/or a unique identifier of a provider of the software-based subscriber identity module, to be used for cellular network access.

Pursuant to a set of further embodiments of the present invention, the mobile device retrieves its cellular radio related capabilities from memory and sends these capabilities to a subscription server identified as per the HS2.0 procedures, at the start of the software-based subscriber identity module provisioning procedure, over the WiFi network.

Pursuant to a set of still further embodiments of the present invention, the cellular radio related capabilities of the mobile device may be stored as part of the DevInfo and/or DevDetail management object residing on the mobile device.

Pursuant to a set of still further embodiments of the present invention, the DevInfo and/or DevDetail management objects may be part of a Hotspot2.0 Mobile device Management Tree Structure, as defined in the WiFi Alliance Passpoint Certification program.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various exemplary embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides. For various example embodiments, the following is applicable: An apparatus comprising means for performing the method of any of the originally filed method claims included herewith.

Still other aspects, features, technical effects, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

These and other aspects are detailed further hereinafter.

DETAILED DESCRIPTION

Examples of methods and apparatuses for provisioning wireless subscriptions using software-based Subscriber Identity Modules (SIMs) are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Once found primarily in coffee shops and hotels, public Wi-Fi hotspots have recently become quite commonplace. Growth of Wi-Fi in public spaces is expected to continue at a very strong pace. This explosive growth is driven by several factors, including the ubiquity of Wi-Fi in mobile devices such as laptops, tablets and smartphones. Many end users have a strong appetite for free or low-cost Wi-Fi connectivity as an alternative or supplement to 3G and 4G data plans. Likewise, many service providers support Wi-Fi hotspots as a means to offload traffic from congested networks to improve the experience of end users.

An industry-wide specification known as Wi-Fi Alliance (WFA) HotSpot 2.0 promulgates standards-based interoperable Wi-Fi authentication and handoff. HotSpot 2.0 was developed to enable, among other things, online purchases of Wi-Fi subscriptions without prior agreement between the user and the service provider. A Wi-Fi connection is used to determine whether online sign-up to a Wi-Fi network is available and, if so, an icon, a name, and a domain name of a service provider are identified. The user may select the service provider based on the icon and/or the name. Thus, HotSpot 2.0 offers a secure way of provisioning Wi-Fi credentials to a mobile phone. Seamless network access is provided wherein authentication no longer requires a browser-based sign-on, and the subscriber is not required to enter a password. Devices are authenticated automatically, using Extensible Authentication Protocols (EAP) based on a Subscriber Identity Module (SIM) card, a username and password, or certificate credentials. The Wi-Fi connections are secured with an enhanced form of Wi-Fi Protected Access (WPA) known as WPA2™-Enterprise to provide a level of security comparable to that of cellular networks. Further details regarding WPA2 are set forth in the IEEE 802.11i-2004 and 802.11i standards which were amendments to the original IEEE 802.11 standard.

The existing HotSpot 2.0 standard is directed to the provisioning of Wi-Fi services and not cellular subscriptions. In the context of cellular subscriptions, a myriad of factors must be considered. For example, what cellular technology and frequency band is supported by the mobile device? Has the mobile device been certified to be used in these frequency bands by a regulatory body and, if so, what regulator identifier is associated with the regulatory body? Is the mobile device data only, or is the device equipped for both voice and data?

Pursuant to a set of illustrative embodiments of the present invention, provisioning of a cellular subscription is provided to a mobile device over a Wi-Fi network, wherein the mobile device may be configured to use a software-based SIM. As used herein, the term cellular may, but need not, refer to any of 2G, 2.5G, 3G, 3G HSPA, 4G, LTE, or any combination thereof. A configuration file is stored in an electronic memory of the mobile device that includes information about at least one cellular technology and at least one frequency band supported by the mobile device. This configuration file may constitute a management object or may be linked to an existing management object of the device by extending a structure of the existing management object. Pursuant to a further set of embodiments of the present invention, the existing management object structure is defined in the HotSpot 2.0 standard.

If the mobile equipment is configured for use with a software-based SIM, certain types of security information may be transferred to the mobile device in order to provide provisioning of the cellular subscription. In the case of LTE, an LTE key K and a plurality of operator-specific LTE key derivation functions may be transferred to the device purchasing the subscription. In the case of UMTS authentication, the transfer of a shared secret key K and a set of algorithms used by an authentication procedure known as MILENAGE may be transferred to the mobile device purchasing a subscription. MILENAGE provides mutual authentication in the sense that the USIM is able to authenticate the network by using a process of symmetric encryption. Conventionally, the MILENAGE key is pre-provided on a USIM card before the card is issued to a user, and the MILENAGE authentication procedure is implemented in an authentication center (AuC) of the network operator and in the USIM itself. A definition of the MILENAGE algorithm is set forth in 3GPP 35.206.

Figure 1:
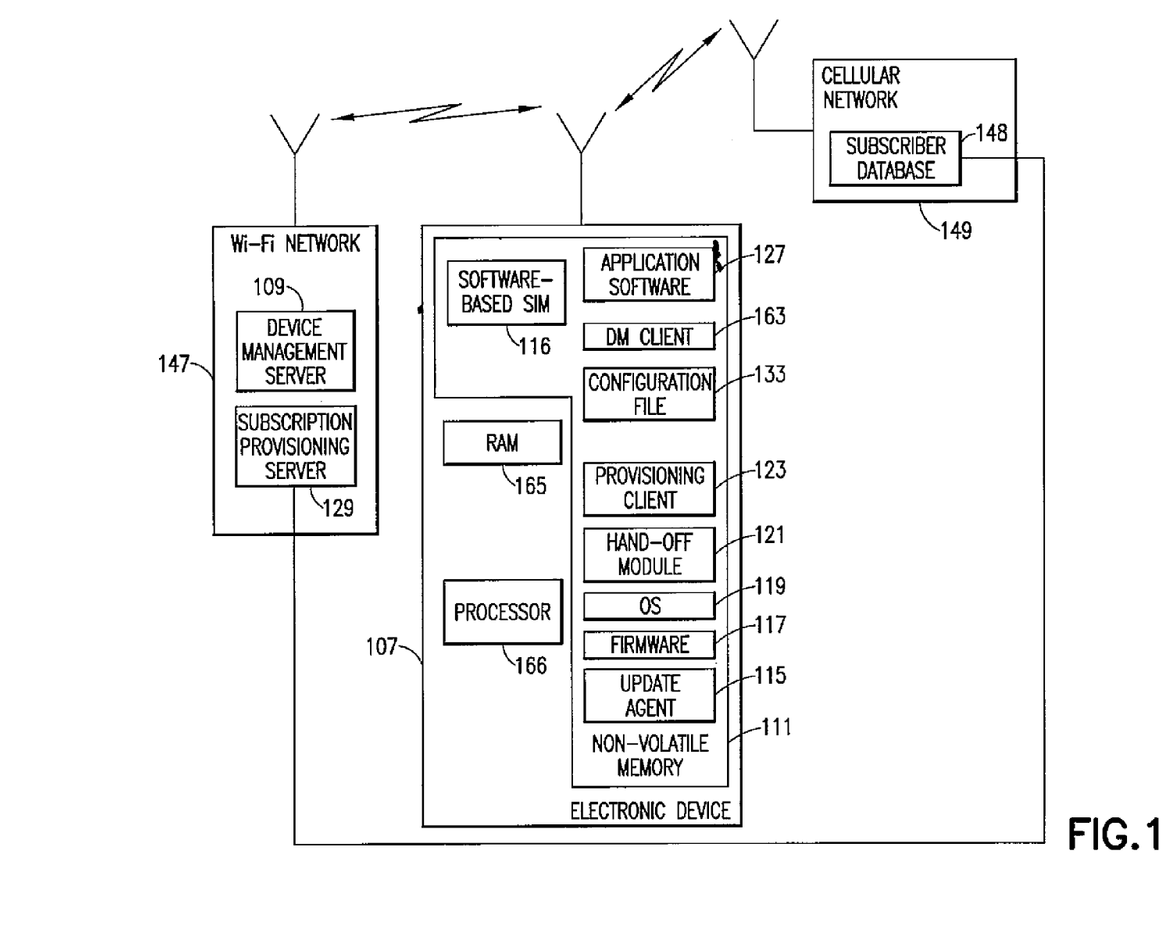
FIG. 1 is a block diagram of an exemplary network that supports provisioning of a cellular subscription over a Wi-Fi network using an electronic device in accordance with a set of illustrative embodiments of the present invention.

FIG. 1 is a perspective block diagram of an exemplary network that supports provisioning of a cellular subscription over a Wi-Fi network using an electronic device 107 in accordance with a set of representative embodiments of the present invention. The electronic device 107 may support a number of features and/or applications that are implemented using software, firmware, or a combination of software and firmware.

Illustratively, the electronic device 107 may, but need not, comprise a mobile handset, a cellular phone, a tablet device, a personal digital assistant (PDA), a pager, a tablet device, a laptop computer, a handheld personal computer (PC), a gaming device having wireless communication capabilities, a music storage and playback appliance having wireless communication capabilities, Internet appliances permitting wireless Internet access and browsing, as well as portable units or terminals that incorporate combinations of such functions. For example, the electronic device 107 may be a mobile phone/user terminal more generally referred to as a user equipment (UE). The UE may be any portable radio device intended for an end user which accesses a wireless network such as a cellular or Wi-Fi or WLAN network.

During or prior to the provisioning of a software-based subscriber identity module (SIM) 116, the electronic device 107 may learn the address of a subscription provisioning server 129 and (optionally) a device management (DM) server 109 over a Wi-Fi network 147. The electronic device 107 has also capability to communicate with a cellular network 149 using a cellular technology and operating in a frequency band supported by the mobile device 107. The cellular network 149 includes a subscriber database 148 with a back-end connection to the subscription provisioning server 129. The cellular network 149 may comprise one or more network access nodes including, but not limited to, a Node B (base station), an evolved Node B (eNB), a cellular base station, a relay stations, a remote radio head, any other type of network node with wireless communication capability and which serves as an access portal enabling any of the above types of UEs to gain access to the wireless network of a specific type of radio access technology. The Wi-Fi network 147 may include one or more WLAN access points, or one or more local area network access points. Although not illustrated in FIG. 1, the Wi-Fi network 147 may also include other application servers such as, for example, a download server, a diagnostics server, a customer care server, and a self-care website/portal.

The electronic device 107 includes a processor 166, a random access memory (RAM) 165, and a non-volatile memory (NVM) 111. For completeness, the RAM 165 and the NVM may each be implemented using any type of computer readable memory that is suitable to the local technical environment and using any suitable data storage technology. Examples of suitable data storage technologies include semiconductor based memory devices, flash memory, magnetic memory devices and systems, optical memory devices and systems, fixed memory, removable memory, or any of various combinations thereof. The processor 166 may be of any type suitable to the local technical environment and may include one or more of general purpose computers, special purpose computers, microprocessors, digital signal processors (DSPs) or processors based on a multicore processor architecture, as non-limiting examples.

Pursuant to a set of illustrative embodiments disclosed herein, the NVM 111 may comprise, for example, NAND or NOR type flash memory or other suitable type of NVM. The NVM 111 may contain a number of software or firmware code components of the electronic device 107 including, for example, application software 127, a device management (DM) client 163, the software-based SIM 116, a provisioning client 123, a hand-off module 121, an operating system (OS) 119, and firmware 117, and an update agent 115. Additional software, firmware, code components, or any of various combinations thereof, may also be present in one or more of the RAM 165 and the NVM 111.

The term "code" may be used herein to represent one or more of executable instructions, operand data, configuration parameters, or other information stored in a memory of the electronic device 107. This memory may include one or more of the NVM 111 or the RAM 165. One or more of the application software 127, the DM client 163, or the software-based SIM 116 of the NVM 111 may include program instructions that, when executed by the associated processor 166, enable the electronic device 107 to operate in accordance with the exemplary embodiments of this invention, as detailed herein. That is, the exemplary embodiments of this invention may be implemented at least in part by computer software executable by the processor 166 of the electronic device 107, or by hardware, or by a combination of software and hardware and firmware.

Pursuant to a set of illustrative embodiment of the present invention, the software-based SIM 116 comprises one or more of a software file or an information packet delivered by a remote server such as, for example, the subscription provisioning server 129. The software-based SIM 116 may be stored in the NVM 111 as shown in FIG. 1. Alternatively or additionally, the software-based SIM 116 could be stored in the RAM 165. In the case of UMTS authentication, the software-based SIM 116 may include a shared secret key K and a set of algorithms belonging to the MILENAGE. In the case of LTE authentication, the software-based SIM 116 may include an LTE key K and one or more operator-specific LTE key derivation functions. The software-based SIM 116 may, but need not, include other types of information in addition to, or in lieu of, the foregoing information.

A provisioning client 123 may process a set of executable instructions in conjunction with a configuration file 133 to provision the electronic device for 107 for access to the Wi-Fi network 147, or a cellular network 149, or both the Wi-Fi network 147 and the cellular network 149. The electronic device 107 may receive provisioning information from, for example, one or more of the device management server 109 or the subscription provisioning server 129, to fix configuration problems or reconfigure software and hardware.

Pursuant to a set of illustrative embodiments of the present invention, provisioning of a cellular subscription for use on the cellular network 149 is provided to a mobile device such as an electronic device 107 over the Wi-Fi network 147, wherein the mobile device may be configured to use the software-based SIM 116. A configuration file 133 that includes one or more cellular network capability related parameters is stored in an electronic memory of the mobile device, such as the NVM 111 or the RAM 165. The configuration file 133 includes information about at least one cellular technology and at least one frequency band supported by the mobile device. This configuration file 133 may constitute a management object (MO) or may be linked to an existing MO of the device by extending a structure of the existing management object, as will be described hereinafter with reference to FIG. 2. Pursuant to a further set of embodiments of the present invention, the existing management object structure is defined in the HotSpot 2.0 standard. Provisioning of the software-based SIM 116 may, but need not, be performed using Open Mobile Alliance (OMA) device management (DM) procedures and/or simple object access protocol (SOAP)-extensible markup language (XML) procedures described in the HS 2.0 standard.

In addition to those elements described above, the electronic device 107 may comprise a downloaded diagnostic client (not shown) that facilitates remote diagnosis, and a traps client (not shown) that facilitates the setting of traps and retrieving of collected information. The DM client 163 of the electronic device 107 may interact with the DM server 109, the diagnostic client, and the traps client, to receive DM commands from the DM server 109 and to implement them in the electronic device 107. A download server may be employed at the Wi-Fi network 147 or the cellular network 149 to download firmware and software updates (e.g., update information in the form of, for example, update packages). The download server may also be used to download new firmware/software such as, for example, the diagnostics client mentioned above, which may then be installed and activated in the electronic device 107.

In one set of illustrative embodiments of the present invention, the device management server 109 may be implemented as an OMA DM-based application server that may be comprised of two parts, an OMA DM-based application, and an OMA DM server. An OMA DM-based application is configured to implement business processes, logic, and data processing, whereas an OMA DM server is configured to implement the functionality required to support the OMA DM protocol by which the OMA DM-based application manipulates OMA DM-capable electronic devices such as the electronic device 107 of FIG. 1.

An OMA DM common framework in accordance with a set of representative embodiments of the present invention is configured to support a set of application programming interfaces (APIs) and callback services, such that one or more OMA DM-based applications may be easily and effectively integrated with the DM server 109. The device management server 109, or the subscription server 129, or both, may provide an API for issuing OMA DM commands and values to OMA DM capable electronic devices, including the ability to explore a device management tree (DM tree) stored in the NVM 111 of the electronic device 107. The DM tree includes a plurality of nodes that are interconnected to form a tree structure, each node representing an available management object. Each of respective individual nodes may be addressed and accessed directly through a corresponding unique uniform resource identifier (URI).

An OMA DM common framework in accordance with one set of representative embodiments of the present invention provides for the real-time sharing of data by multiple OMA DM-based applications, and may include sharing of the data from the DM tree in an electronic device such as the electronic device 107 of FIG. 1. In a representative embodiment of the present invention, each OMA DM-based application may access the data required to create OMA DM commands for the electronic device 107.

In practice, the electronic device 107 of FIG. 1 may be manufactured, sold, or provided by any of a variety of different entities. Each of these entities may place electronic device 107 setting parameters (e.g., GPRS settings) at a different or non-standardized location within the DM tree of the electronic device 107. This may cause the node uniform resource identifier (URI) of a given parameter to be different for each electronic device make, model, and version.

Pursuant to a set of illustrative embodiments of the present invention, a data store is provided for managing DM tree information. This data store may be implemented using the NVM 111. Alternatively or additionally, the data store could be implemented using the RAM 165. Such a data store may hold single device information such as an international mobile equipment identity (IMEI) for the electronic device 107, a password, and a nonce, to name only a few examples. Some data may be customized for each OMA DM-based application including, for example, the type of authentication scheme to be used, and bootstrap content. Some representative embodiments of the present invention allow a user of a customer care system to modify the bootstrap content, to specify the security type and profile type for devices. The security type may, for example, be one or both of "Networkpin" and "Userpin".

Figure 2:
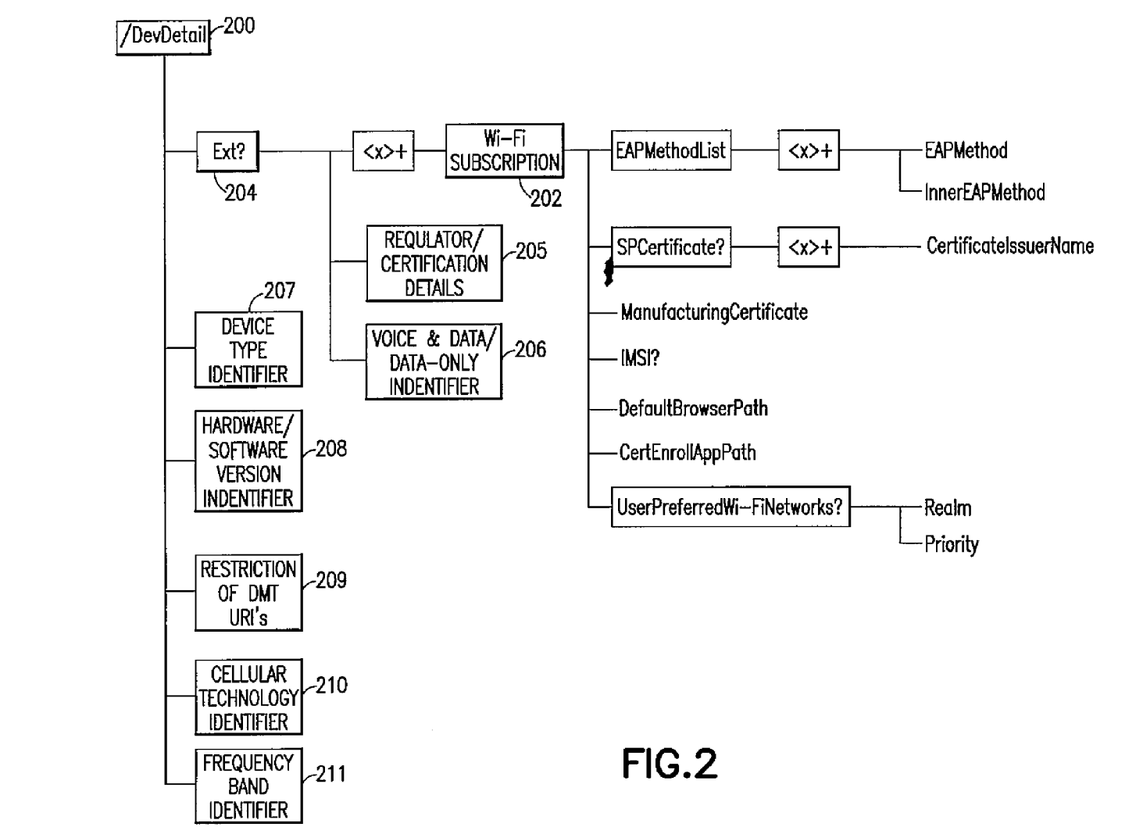
FIG. 2 is an illustrative example of a management object that includes an exemplary configuration file according to a set of illustrative embodiment of the present invention.

FIG. 2 is an illustrative example of an exemplary configuration file 133 (FIG. 1) for storing one or more cellular network capability related parameters. In the example of FIG. 2, the configuration file is stored as part of a management object (MO) that, in turn, is part of a device management (DM) tree. In the present example, the MO is called DevDetail 200 solely for purposes of illustration, as this is just an example of where the device cellular network capability related parameters may be stored. The DM tree may be stored in the non-volatile memory 111 of the electronic device 107 (FIG. 1). The electronic device 107 may then retrieve the configuration file 133 (FIG. 1) from the non-volatile memory 111 and send the configuration file to the subscription provisioning server 129 (FIG. 1) over the Wi-Fi network 147.

Returning to FIG. 2, the illustrative MO (such as DevDetail 200) includes a plurality of nodes arranged in a tree structure, each of which may be addressed using a unique URI as discussed previously. For example, the URI of the root of the DevDetail 200 MO is ./DevDetail. This illustrative MO may be extended to include the configuration file 133 (FIG. 1) by extending one or more of the nodes in the tree structure of FIG. 2. For example, the node for the Wi-Fi subscription 202 MO may be extended by adding one or more child nodes to the Wi-Fi subscription 202 MO. Similarly, the node for the Ext? 204 MO may be extended by adding one or more child nodes to the Ext? 204 MO.

These added child nodes may include details about the electronic device 107 (FIG. 1), such as a device type identifier 207, a regulatory certification details 205 node, a hardware and software version identifier 208, and any restrictions of DM tree (DMT) URIs 209. The child nodes may also include information about a cellular technology and a frequency band that are supported by the electronic device 107 (FIG. 1), such as a cellular technology identifier 210 and a frequency band identifier 211. A voice and data/data-only identifier 206 indicates whether the electronic device 107 (FIG. 1) is data only, versus voice and data. The voice and data/data-only identifier 206 may be pre-provisioned and linked into the MO (FIG. 2) tree structure. This information is important, because for electronic devices that are voice and data devices, there are regulatory requirements which are not applicable for data-only devices, such as the ability to place an E911 call.

By way of example, the DM tree may, but need not, include an MO known as DevInfo. The subscription provisioning server 129 (FIG. 1) may use the DevInfo MO to obtain specific identifying data about the electronic device 107. In general, the DevInfo MO contains a device ID for the electronic device 107, along with a manufacturer identifier, a model number identifier, and a language identifier. The basic components of the DevInfo management object may be configured through system properties.

Figure 3A:
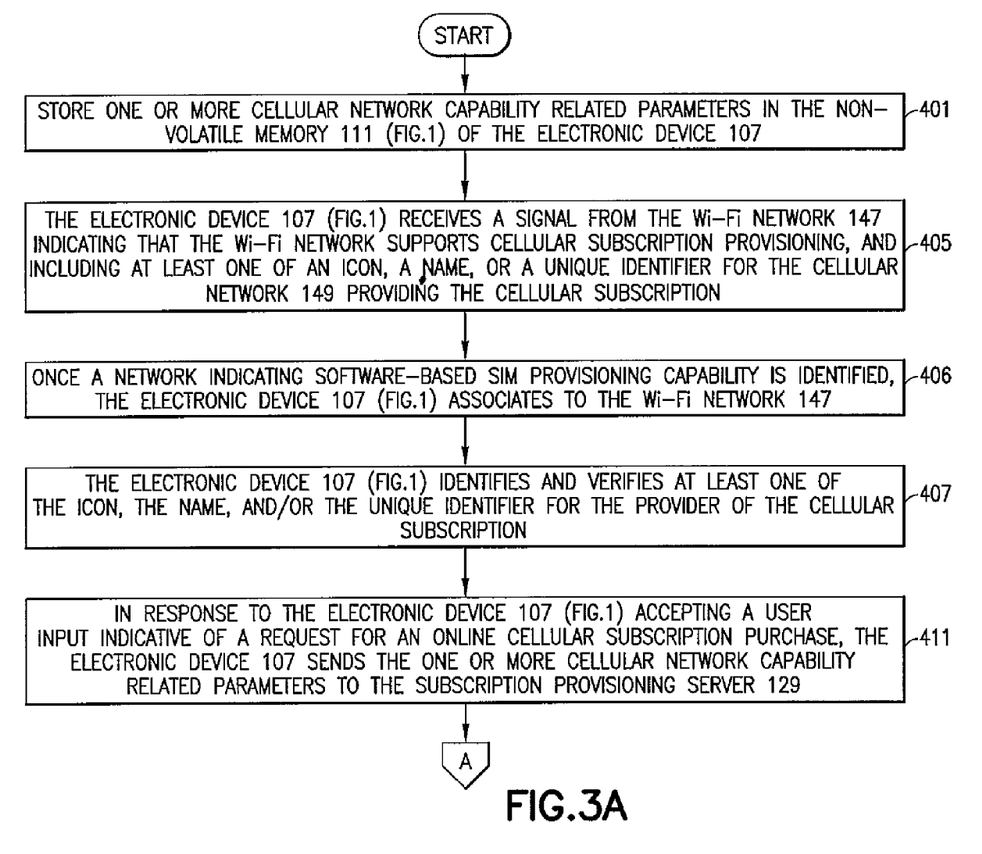
FIGS. 3A and 3B together comprise a process flow diagram that illustrates a method, and a result of execution by one or more processors of a set of computer program instructions embodied on a computer readable memory, for provisioning a cellular subscription over a Wi-Fi network using an electronic device in accordance with a set of illustrative embodiments of the present invention.
Figure 3B:
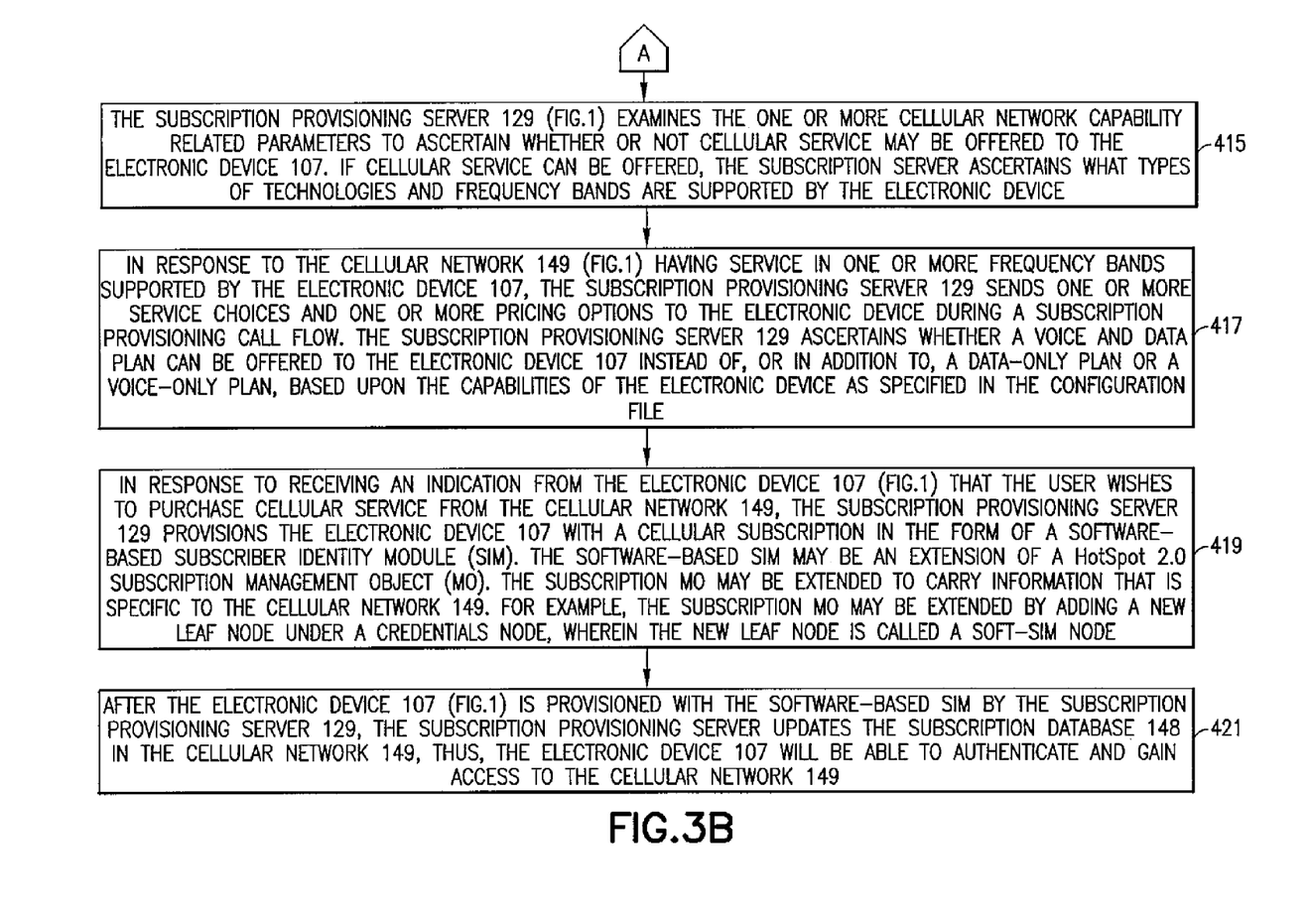

FIGS. 3A and 3B together comprise a process flow diagram that illustrates a method, and a result of execution by one or more processors of a set of computer program instructions embodied on a computer readable memory, for provisioning a cellular subscription over a Wi-Fi network using an electronic device in accordance with a set of illustrative embodiments of the present invention. The operational sequence of FIGS. 3A and 3B commences at block 401 of FIG. 3A where one or more cellular network capability related parameters are stored in the non-volatile memory 111 (FIG. 1) of the electronic device 107. This step may, but need not, be performed by storing a DM tree having an extended MO wherein the MO has been extended to include a link to a configuration file. Alternatively, the configuration file may constitute an existing management object of the mobile device. The configuration file includes information about at least one cellular technology and at least one frequency band supported by the electronic device 107.

The operational sequence of FIG. 3A progresses to block 405 where the electronic device 107 (FIG. 1) receives a signal from the Wi-Fi network 147 indicating that the Wi-Fi network provides support for cellular subscription provisioning, and including at least one of an icon, a name, or a unique identifier for the cellular network 149 providing the cellular subscription. The operational sequence advances to block 406 where, once a network indicating software-based SIM provisioning capability is identified, the electronic device 107 (FIG. 1) associates to the Wi-Fi network 147. The Wi-Fi network 147 may, but need not, be robust security network (RSN)-enabled. If RSN-enabled, access requiring server-side only authentication may be provided.

At block 407 (FIG. 3A), the electronic device 107 identifies and verifies one or more of the icon, the name, and/or the unique identifier for the cellular network providing the cellular subscription. For example, the electronic device 107 (FIG. 1) may follow the procedures described in the HotSpot 2.0 specification to verify the icon, name, and identity of the provider, by using Wi-Fi procedures before association. Such a Wi-Fi network 147 may allow mobile devices (such as electronic device 107) to access the subscription provisioning server 129 either by employing an open (no authorization required) Wi-Fi network or by providing server-side only authentication possibilities for an RSN-enabled network.

Next, at block 411 (FIG. 3A), in response to the electronic device 107 accepting a user input indicative of a request for an online cellular subscription purchase, the electronic device 107 (FIG. 1) sends the one or more cellular network capability related parameters to the subscription provisioning server 129. For example, an extended MO may include parameters describing one or more radio network capabilities of the mobile device. Alternatively or additionally, the extended MO may comprise an extended DevDetail 200 (FIG. 2) MO. Illustratively, a uniform resource locator (URL) for the subscription provisioning server 129 is provided to the electronic device 107 before the association of block 406 (FIG. 3A).

At block 415 (FIG. 3B), the subscription provisioning server 129 (FIG. 1) examines the one or more cellular network capability related parameters to ascertain whether or not cellular service may be offered to the electronic device 107. If cellular service can be offered, the subscription provisioning server 129 ascertains what types of technologies and frequency bands are supported by the electronic device 107. For example, the supported technologies can be any of 2G, 3G, LTE, or others. The frequency bands may include, for example, LTE bands 4 and 17.

At block 417 (FIG. 3B), in response to the cellular network 149 (FIG. 1) having service in one or more frequency bands supported by the electronic device 107, the subscription provisioning server 129 sends one or more service choices and one or more pricing options to the electronic device 107 during a subscription provisioning call flow. This subscription provisioning call flow is defined, for example, in the HS2.0 specification. At this time, the subscription provisioning server 129 ascertains whether a voice and data plan can be offered to the electronic device 107 instead of, or in addition to, a data-only plan or a voice-only plan, based upon the capabilities of the electronic device as specified in the configuration file.

At block 419 (FIG. 3B), in response to receiving an indication from the electronic device 107 (FIG. 1) that the user wishes to purchase cellular service from the cellular network 149, the subscription provisioning server 129 provisions the electronic device 107 with a cellular subscription in the form of a software-based SIM. The software-based SIM may, but need not, be an extension of a HotSpot 2.0 subscription MO. The subscription MO may be extended to carry information that is specific to the cellular network 149. For example, the subscription MO may be extended by adding a new leaf node under a Credentials node, wherein the new leaf node is called a soft SIM.

At block 421 (FIG. 3B), after the mobile device is provisioned with the soft SIM by the subscription provisioning server 129 (FIG. 1), the subscription provisioning server updates the subscriber database 148 in the cellular network 149. Thus, the electronic device 107 will be able to authenticate and gain access to the cellular network 149.

The soft SIM may, but need not, be provided in the form of a soft-SIM leaf node that includes one or more the following items: an integrated circuit card identifier (IC-CID), an international mobile subscriber identity (IMSI) if voice service is included, an authentication key (shared secret), a binary function which takes a rand as an input and generates a key K(rand), a technology identifier that specifies a technology to be used (2G, 3G, LTE), a frequency band identifier that specifies possible bands of operation, or a cellular key derivation function that is needed to derive an integrity key and a cipher key when connecting to the cellular network 149.

In practice, the information in the soft SIM could be lost by a mobile device. This could occur, for example, during a reflash procedure or a crash. The HotSpot 2.0 procedures defined by the WiFi Alliance provide a way to remediate and reload a lost WiFI subscription by contacting a remediation server function which is expected to be available in networks that are equipped with the subscription provisioning server 129. It is proposed that operators providing cellular subscriptions also provide a cellular subscription remediation server, accessible both over the WiFi network and the cellular network 149. A mobile device with a lost cellular subscription would follow the HotSpot 2.0 remediation procedures to recover its cellular subscription.

It is also suggested that during the cellular subscription provisioning procedure, the subscription server creates a user account. This user account allows users to manage their own subscriptions online. The user account may be created by sending a link to an email address provided by the user during the subscription and awaiting the user to activate the link.

The ICCID identifies each SIM internationally. A full ICCID is 19 or 20 characters. It is possible to extract the ICCID by using an 'AT!ICCID?' modem command. The format of the ICCID is: MMCC IINN NNNN NNNN NN C x. MM=Constant (ISO 7812 Major Industry Identifier, =89 for "Telecommunications administrations and private operating agencies"). CC=Country Code (i.e. 61=Australia, 86=China); II=Issuer Identifier (AAPT=14, EZI-PhoneCard=88, Hutchison=06, Optus=02/12/21/23, Telstra=01, Telstra Business=00/61/62, Vodafone=03); N{12}=Account ID ("SIM number"); C=Checksum calculated from the other 19 digits using an algorithm known as the Luhn algorithm.

An extra 20th digit is returned by the 'AT!ICCID?' command, but this digit is not part of the ICCID.

The electronic device 107 (FIG. 1) could be provisioned with one or more software-based SIMs 116 even if the electronic device already has a physical SIM card, in which case the electronic device 107 would become a multi-SIM device. An electronic device 107 with one or more soft-SIM credentials would follow the policy in the device to search for a cellular network 149 when switched on, and authenticate with the selected cellular network by sending an attach request. The electronic device 107 then calculates AUTN from the parameters received from the cellular network 149 to compare the calculated AUTN with AUTN received from the network for authenticating the network.

The various steps summarized in FIGS. 3A and 3B may be viewed as method steps, and/or as operations that result from operation of computer program code embodied on a memory and executed by a processor, and/or as a plurality of coupled logic circuit elements constructed to carry out the associated function(s).

Among the technical effects of these teachings, provisioning of SIM credentials is performed over the air without prior agreement between the user and the cellular carrier over a Wi-Fi communications link. Wi-Fi is a different radio technology than cellular, providing a provisioning solution which is different from current practice, but which is workable, as proved by the WiFi ecosystem, where buying subscriptions online is a current practice worldwide. In a few jurisdictions, voice subscriptions are currently used for E911 calls and also to track criminal activity, so regulators may have some resistance to the foregoing approach. In these jurisdictions, the over-the-air provisioning of SIM credentials may be limited to data plans.

Various modifications and adaptations to the foregoing exemplary embodiments of this invention may become apparent to those skilled in the relevant arts in view of the foregoing description. It will be further recognized that various blocks discussed above may be performed as steps, but the order in which they are presented is not limiting and they may be performed in any appropriate order with or without additional intervening blocks or steps.

In general, the various exemplary embodiments may be implemented in hardware or special purpose circuits, software, logic or any combination thereof. For example, some aspects may be implemented in hardware, while other aspects may be implemented in embodied firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, embodied software and/or firmware, special purpose circuits or logic, general purpose hardware or controller or other computing devices, or some combination thereof, where general purpose elements may be made special purpose by embodied executable software.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

While various exemplary embodiments have been described, it should be appreciated that the practice of the invention is not limited to the exemplary embodiments shown and discussed herein. For example, while the exemplary embodiments have been described above in the context of UMTS, LTE, or GPRS electronic devices, it should be appreciated that the exemplary embodiments of this invention are not limited for use with only these particular types of wireless communication systems. Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   storing a configuration file in an electronic memory of a mobile device, the configuration file including information specifying at least one cellular technology and at least one frequency band supported by the mobile device; and
   using the configuration file and security information comprising subscriber identity module credentials transferred to the mobile device to perform provisioning of a cellular subscription to the mobile device over a Wi-Fi network;
   wherein the subscriber identity module credentials transferred to the mobile device over the WiFi network comprise a software-based subscriber identity module; and
   the method further comprising retrieving one or more cellular radio related capabilities from the electronic memory and sending these capabilities over the Wi-Fi network to a subscription server identified during the provisioning.

2. The method of claim 1 wherein the configuration file constitutes an existing management object of the mobile device, or wherein the configuration file is linked to an existing management object of the mobile device.

3. The method of claim 1 further comprising detecting during a Wi-Fi scanning procedure a Wi-Fi network that is capable of performing an online provisioning of the software-based subscriber identity module, wherein the software-based subscriber identity module provides access to at least one type of a cellular network.

4. The method of claim 3 wherein the Wi-Fi scanning procedure comprises receiving a Wi-Fi signal in one or more of a beacon frame or a probe response frame.

5. The method of claim 3 further comprising receiving an advertising signal during the Wi-Fi scanning procedure and, in response to receipt of the advertising signal, identifying an icon, a name, and/or a unique identifier of a provider of the software-based subscriber identity module, to be used for cellular network access.

6. The method of claim 1 further comprising storing the one or more cellular radio related capabilities as part of a DevInfo management object and/or a DevDetail management object that is part of a WiFi Alliance Passpoint Certification program Hotspot2.0 Mobile Device Management Tree Structure.

7. A method comprising:
   storing a configuration file in an electronic memory of a mobile device, the configuration file including information specifying at least one cellular technology and at least one frequency band supported by the mobile device; and
   using the configuration file and security information comprising subscriber identity module credentials transferred to the mobile device to perform provisioning of a cellular subscription to the mobile device over a Wi-Fi network, wherein the subscriber identity module credentials transferred to the mobile device over the WiFi network comprise a software-based subscriber identity module;
   the method further comprising receiving a signal from a Wi-Fi network indicating that the provisioning of the cellular subscription for the software-based subscriber identity module is available at that Wi-Fi network; sending a query to the Wi-Fi network for information; and
   receiving a response to the query which enables an identification of an icon, a name, and/or a unique identifier of a provider of the software-based subscriber identity module, to be used for cellular network access.

8. An apparatus comprising one or more processors and one or more memories including computer program code, the one or more memories and the computer program code being configured, with the one or more processors, to cause the apparatus to perform at least:
   storing a configuration file in an electronic memory of a mobile device, the configuration file including information specifying at least one cellular technology and at least one frequency band supported by the mobile device; and
   using the configuration file and security information comprising subscriber identity module credentials transferred to the mobile device to perform provisioning of a cellular subscription to the mobile device over a Wi-Fi network;
   wherein the one or more memories and the computer program code are further configured, with the one or more processors, to cause the apparatus to perform retrieving one or more cellular radio related capabilities from the electronic memory and sending these capabilities over the Wi-Fi network to a subscription server identified during the provisioning.

9. The apparatus of claim 8 wherein the configuration file constitutes an existing management object of the mobile device, or wherein the configuration file is linked to an existing management object of the mobile device.

10. The apparatus of claim 8, wherein the subscriber identity module credentials transferred to the mobile device over the WiFi network comprise a software-based subscriber identity module.

11. The apparatus of claim 10, wherein the one or more memories and the computer program code are further configured, with the one or more processors, to cause the apparatus to perform detecting during a Wi-Fi scanning procedure a Wi-Fi network that is capable of performing an online provisioning of the software-based subscriber identity module, wherein the software-based subscriber identity module provides access to at least one type of a cellular network.

12. The apparatus of claim 11, wherein the Wi-Fi scanning procedure comprises receiving a Wi-Fi signal in one or more of a beacon frame or a probe response frame.

13. The apparatus of claim 11, wherein the one or more memories and the computer program code are further configured, with the one or more processors, to cause the apparatus to perform receiving of an advertising signal during the Wi-Fi scanning procedure and, in response to receipt of the advertising signal, identifying an icon, a name, and/or a unique identifier of a provider of the software-based subscriber identity module, to be used for cellular network access.

14. The apparatus of claim 8, wherein the one or more memories and the computer program code are further configured, with the one or more processors, to cause the apparatus to perform storing the one or more cellular radio related capabilities as part of a DevInfo management object and/or a DevDetail management object that is part of a WiFi Alliance Passpoint Certification program Hotspot2.0 Mobile Device Management Tree Structure.

15. An apparatus comprising one or more processors and one or more memories including computer program code, the one or more memories and the computer program code being configured, with the one or more processors, to cause the apparatus to perform at least:
storing a configuration file in an electronic memory of a mobile device, the configuration file including information specifying at least one cellular technology and at least one frequency band supported by the mobile device; and
using the configuration file and security information comprising subscriber identity module credentials transferred to the mobile device to perform provisioning of a cellular subscription to the mobile device over a Wi-Fi network, wherein the subscriber identity module credentials transferred to the mobile device over the WiFi network comprise a software-based subscriber identity module;
and wherein the one or more memories and the computer program code are further configured, with the one or more processors, to cause the apparatus to perform:
receiving a signal from a Wi-Fi network indicating that the provisioning of the cellular subscription for the software-based subscriber identity module is available at that Wi-Fi network;
sending a query to the Wi-Fi network for information; and
receiving a response to the query which enables an identification of an icon, a name, and/or a unique identifier of a provider of the software-based subscriber identity module, to be used for cellular network access.

16. A computer program product comprising a non-transitory computer-readable memory bearing computer program code embodied therein for use with a computer, the computer program code comprising code for:
storing a configuration file in an electronic memory of a mobile device, the configuration file including information specifying at least one cellular technology and at least one frequency band supported by the mobile device;
using the configuration file and security information comprising subscriber identity module credentials transferred to the mobile device to perform provisioning of a cellular subscription to the mobile device over a Wi-Fi network; and
retrieving one or more cellular radio related capabilities from the electronic memory and sending these capabilities over the Wi-Fi network to a subscription server identified during the provisioning.

17. The computer program product of claim 16 wherein the configuration file constitutes an existing management object of the mobile device, or wherein the configuration file is linked to an existing management object of the mobile device.

18. The computer program product of claim 16 wherein the subscriber identity module credentials transferred to the mobile device over the WiFi network comprise a software-based subscriber identity module.

19. The computer program product of claim 18 further comprising code for detecting during a Wi-Fi scanning procedure a Wi-Fi network that is capable of performing an online provisioning of the software-based subscriber identity module, wherein the software-based subscriber identity module provides access to at least one type of a cellular network.

20. The computer program product of claim 19 wherein the Wi-Fi scanning procedure comprises receiving a Wi-Fi signal in one or more of a beacon frame or a probe response frame.

21. The computer program product of claim 19 further comprising code for receiving an advertising signal during the Wi-Fi scanning procedure and, in response to receipt of the advertising signal, identifying an icon, a name, and/or a unique identifier of a provider of the software-based subscriber identity module, to be used for cellular network access.

22. The computer program product of claim 16 further comprising storing the one or more cellular radio related capabilities as part of a DevInfo management object and/or a DevDetail management object that is part of a WiFi Alliance Passpoint Certification program Hotspot2.0 Mobile Device Management Tree Structure.

23. A computer program product comprising a non-transitory computer-readable memory bearing computer program code embodied therein for use with a computer, the computer program code comprising code for:
storing a configuration file in an electronic memory of a mobile device, the configuration file including information specifying at least one cellular technology and at least one frequency band supported by the mobile device; and
using the configuration file and security information comprising subscriber identity module credentials transferred to the mobile device to perform provisioning of a cellular subscription to the mobile device over a Wi-Fi network, wherein the subscriber identity module credentials transferred to the mobile device over the WiFi network comprise a software-based subscriber identity module;
the computer program code further comprising code for receiving a signal from a Wi-Fi network indicating that the provisioning of the cellular subscription for the software-based subscriber identity module is available at that Wi-Fi network; sending a query to the Wi-Fi network for information; and receiving a response to the query which enables an identification of an icon, a name, and/or a unique identifier of a provider of the software-based subscriber identity module, to be used for cellular network access.

* * * * *